United States

Mermoz

4,006,421

Feb. 1, 1977

[54] MEANS FOR IMPROVING THE SIGNAL/NOISE RATIO OF SIGNALS PICKED UP BY AERIALS COMPRISING SEVERAL ELEMENTS

[75] Inventor: Henri Mermoz, Sanary-sur-Mer, France

[73] Assignee: Compagnie Industrielle des Telecommunications Cit-Alcatel, Paris, France

[22] Filed: June 21, 1967

[21] Appl. No.: 649,421

[30] Foreign Application Priority Data

Oct. 13, 1966 France .............................. 66.79765
Feb. 22, 1967 France .............................. 67.96072
Feb. 23, 1967 France .............................. 67.96240

[52] U.S. Cl. ................................ 325/474; 325/473; 325/476; 235/181
[51] Int. Cl.$^2$ .......................................... H04B 1/10
[58] Field of Search .......... 325/472, 473, 474, 476; 235/181; 324/77 E, 77 H

[56] References Cited

UNITED STATES PATENTS

3,532,867  10/1970  Ricketts, Jr. et al. ............. 325/473

Primary Examiner—Howard A. Birmiel
Attorney, Agent, or Firm—Cushman, Darby & Cushman

[57] ABSTRACT

Various systems for improving the useful signal to noise ratio of signals received on different aerials and for use when the noise comes from an external source so that the noises received by the different aerials are at least partially intercorrelated are disclosed with compensating delay newworks for making the different useful signals identical with each other, in conjunction with an assembly, which takes on any one of numerous forms, for causing those identical signals plus their respective noise signals to undergo phase and/or amplitude modifications so that the intercorrelated noises come closer to the conditions of equality of amplitude and phase opposition than the useful signals themselves. The so modified signals are then added so as to eliminate the equal amplitude phase opposed noise signals.

15 Claims, 11 Drawing Figures

MEANS FOR IMPROVING THE SIGNAL/NOISE RATIO OF SIGNALS PICKED UP BY AERIALS COMPRISING SEVERAL ELEMENTS

The present invention relates to means for improving the signal/noise ratio of electric signals developed from ultrasonic, electromagnetic or other signals which are picked up by aerials composed of a plurality of separate pick-up elements and it is concerned more especially with the said processes and means for which the electric signals to be detected are narrow band signals.

The invention is applicable to the case where, when the source of interference noises is external, the noises applied to the different elements of aerials are at least partially intercorrelated, in accordance with a law which can be slowly variable as a function of time.

The means according to the invention makes it possible for these variations to be continuously matched, so as to impart permanently to the assembly the maximum "aerial gain" (or signal/noise ratio, a quantity proportional to the said gain) which is compatible with the distribution of the noises to the various elements of the aerial.

Processes and means which can be used for this purpose are already known from French Pat. No. 1,347,229 and its first certificate of addition No. 84,165, these comprising the following elements:

an electric channel associated with each aerial element and suitable for collecting the electric voltages established by this element as a function of the waves which it receives: each of these electric voltages comprises a useful signal and an interference noise;

compensation means suitable for making identical with one another (both as regards intensity and phase) the parts of the said voltages which respectively represent the useful signal on each of the said channels;

band-pass filters with a narrow band centered on the mean frequency of the useful signals to be detected, these filters having identical gains and being respectively inserted into each of the said channels;

means for causing each of the voltages filtered in these filters to undergo phase and/or amplitude modifications such that the intercorrelated interference noises accompanying the useful signals come closer to the conditions of equality of amplitude and phase opposition than the said signals themselves;

and finally means for adding the said signals as thus modified.

By means of these arrangements, the intercorrelated interference noises which accompany the useful signals are at least partly compensated for by causing their assembly to undergo modifications such that, after these modifications, the said interference noises associated with each useful signal are more suitable for being eliminated by addition than the said useful signals, so that after final addition, a signal sum is obtained at the output which is freed at least in part from its intercorrelated interference noises, and for the output signal, the signal/noise ratio is thus at its maximum.

This ratio even becomes theoretically infinite when the interference noise is formed exclusively by a coherent noise coming from a direction other than that of the useful signal.

These known arrangements are divided into two assemblies: the first is designed to supply in the form of electric voltages a means for effecting the previously mentioned phase and/or amplitude modifications. These modifications themselves are carried out in the second assembly.

The present invention has for its object a means of this type, which comprises more simple members and which is based as regards essentials on the following considerations:

a multiplier of electric voltages is a complicated and delicate member.

it is easier to multiply an alternating voltage by a slowly variable (quasi-continuous) voltage than to multiply two alternating voltages with one another.

certain of the variants described permit of dispensing with the auxiliary generator which the known arrangements include.

Various embodiments of the means according to the invention will now be described by reference to the accompanying figures, wherein.

Figure 1:
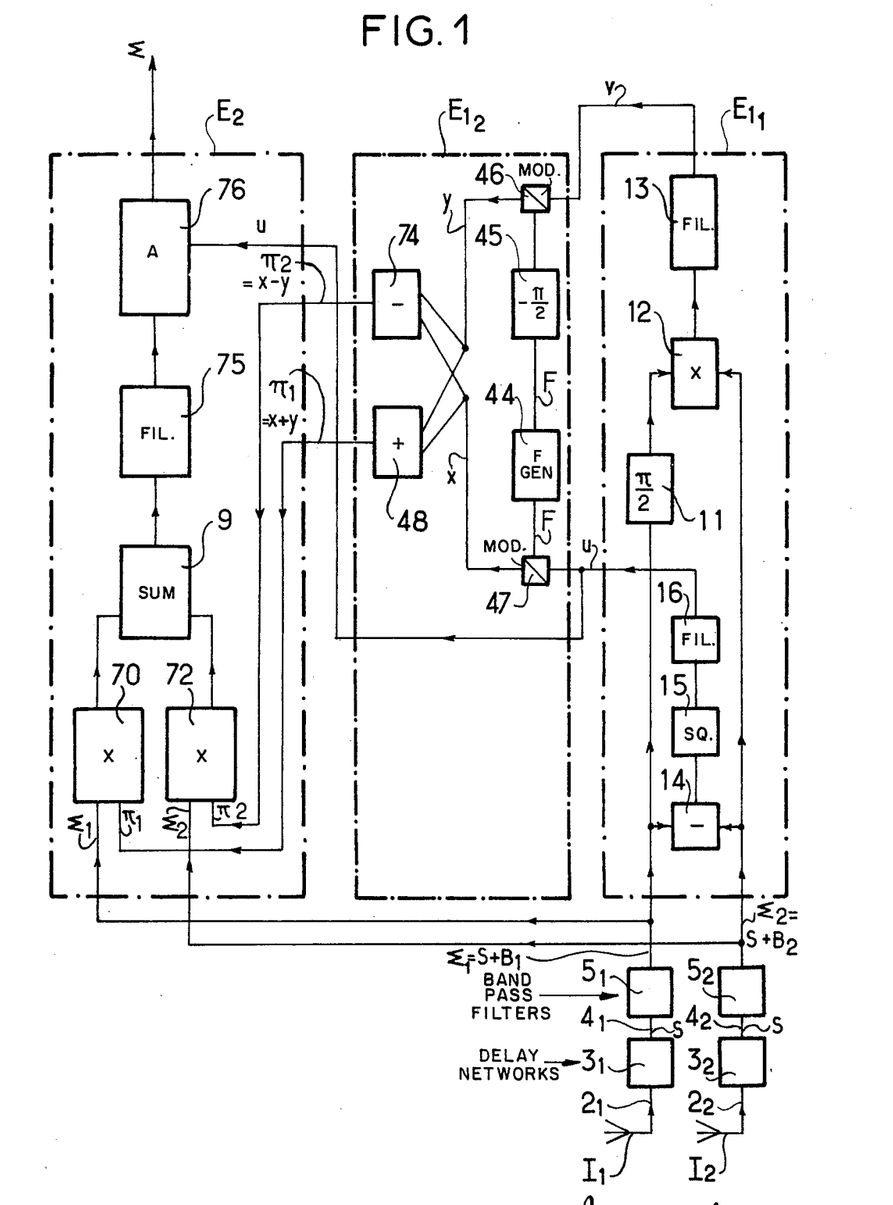
FIG. 1 shows an arrangement which can be used in the case where the voltages received at the two inputs comprise interference noises of equal strengths, this arrangement comprising two members multiplying alternating voltages.

The embodiment which is shown in FIG. 1 comprises two aerial elements $I_1$ and $I_2$, respectively associated with two electric channels $2_1$ and $2_2$. Included in these latter are two delay networks $3_1$, $3_2$, the purpose of which is to compensate for the difference between the useful signals received on the two channels, so as to apply to their outputs $4_1$ and $4_2$, two completely identical signals S (t).

It is assumed that the spectrum of the signal S (t) is entirely contained in a narrow frequency band $f_o \pm \Delta f$, which represents the most frequent case in sonar or radar detection.

Respectively connected to the outputs $4_1$ and $4_2$ are two identical band-pass filters $5_1, 5_2$, of which the narrow band, with a width of $2\Delta f$, is centered on $f_o$ and completely contains the signal S (t) to be detected. The gain of these filters is identical on each channel, constant (for example equal to unity) in the envisaged narrow band, and zero or negligible outside this band.

At the outputs of the said filters $5_1$ and $5_2$, the useful signal is always S (t) and the two interference noises are indicated by $B_1$ (t) and $B_2$ (t). The signals and noises will be indicated more briefly in the following by S, $B_1$, $B_2$.

Two electric voltages, called $\pi_1 = x + y$ and $\pi_2 = x - y$, are developed in a first assembly indicated as $E_1$ from the intercorrelation properties of the noises $B_1$ (t) and $B_2$ (t); these two voltages enter the second assembly, indicated as $E_2$, in order to modify therein the input data $B_1$ + S and $B_2$ + S.

For this purpose, the arrangement according to FIG. 1, which is applicable to the case where the strengths of the two noises $B_1$ and $B_2$ are equal, comprises the following elements:

Assembly $E_1$: connected downstream of the filters $5_1$, $5_2$ is a member 14, effecting the difference $B_1 - B_2$ and of which the output is connected to the voltage squarer 15, that is to say, a member of a type known per se, which supplies a voltage proportional to the square of its input voltage. The output of the squarer 15 is connected to a low-pass filter 16, having a time constant T. This latter is chosen to be of the same order of magnitude as the slow variations of the noises under consideration.

At the output of this low-pass filter 16, a slowly variable voltage u is collected, this representing in adaptable manner the power of the difference of the two noises.

On the other hand, the output of the filter $5_1$ is also connected, in series with a phase converter 11 producing a phase shift of $+ \pi/2$, to an input of a voltage multiplier 12, of which the other input is connected directly to the output of the filter $5_2$ and of which the output is connected to a low-pass filter 13 having the same time constant T as the filter 16.

At the output of the filter 13, there is obtained a slowly variable voltage v, which represents in adaptable manner the mean of the product of the two noises brought into phase quadrature. The preceding elements form the sub-assembly $E_{1,1}$ of the assembly $E_1$.

The voltages u and v are applied to a sub-assembly $E_{1,2}$ formed as follows:

It comprises an auxiliary generator 44, supplying an auxiliary frequency F different from $f_o$. This generator supplies a local frequency, firstly to a modulator 47 which is moreover fed with the voltage u, and secondly, by means of a phase converter 45 producing a phase shift $- \pi/2$ to the frequency F, to a modulator 46 which is moreover fed by the voltage v;

The assembly of these two modulators 47 and 46 provides two voltages of frequency F, indicated by x and y, and of amplitudes which are respectively proportional to u and v.

The voltage x is applied simultaneously to a first input of a summation member 48 and to a first input of a member 74 effecting a difference, while the voltage y is applied to the second inputs of the said members 48 and 74. A voltage $x + y$ is thus received at the output of 48, and a voltage $x - y$ at the output of 74, these two voltages being alternating voltages of frequency F.

The modification of the voltages $B_1$ + S and $B_2$ + S is now effected in the assembly $E_2$.

To this end, the output of the filter $5_1$ is connected to a first input of a first multiplier member 70 and the output of the filter $5_2$ is connected to a first input of a second multiplier member 72, the second inputs of these two members being respectively connected to the outputs of the summation member 48 and difference member 74.

The outputs of the multipliers 70 and 72 are connected to the inputs of a summation member 9, to the output of which is connected a filter 75 intended to isolate the upper beat frequency $f_o + F$, and at the output of which there is received an alternating voltage V at the said frequency $f_o + F$.

This voltage V is applied to the input of an amplifier 76, having a control circuit receiving the voltage u obtained at the output of the filter 16. This amplifier is arranged in such a way that its gain is inversely proportional to the slowly variable voltage u. The purpose of this amplifier is to compensate for the modification undergone by the signal S in the preceding members, so that it restores at its output a useful signal of the same amplitude as the signal S (on which is superimposed an interference noise reduced to the minimum).

The modified embodiment according to FIG. 2 differs from that according to FIG. 1 in the following points:

The complete sub-assembly $E_{1,2}$ is omitted and the slowly variable voltages u and v directly enter the assembly $E_2$.

The latter is modified as follows:

The branch conductors from the output of the filters $5_1$ and $5_2$, instead of directly feeding multipliers 70 and 72, as in the case of FIG. 1, are connected in the following manner:

The output voltages of the filters $5_1$ and $5_2$ are sent, in part directly to the two inputs of a first summation device 77 and in part, after having been displaced in phase respectively by $- \pi/2$ and $+ \pi/2$ in the phase converters 78 and 80, to the inputs of a second summation device 79. The outputs of these two summation devices are respectively connected to the first inputs of two multipliers 81 and 82, of which the second inputs respectively receive the voltages u and v.

The outputs of the multipliers 81 and 82 are respectively connected to the two inputs of a summation device or adder 83, and the voltage V, which in this case has a frequency $f_o$ and which is picked up at the output of 83, feeds the amplifier 76 which is identical with that of FIG. 1 and of which the control circuit also receives the voltage u at the output of the filter 16.

The two multipliers 81 and 82 are thus in this case of the more simple type, which effects a multiplication of an alternating voltage by a slowly variable voltage.

Figure 2:
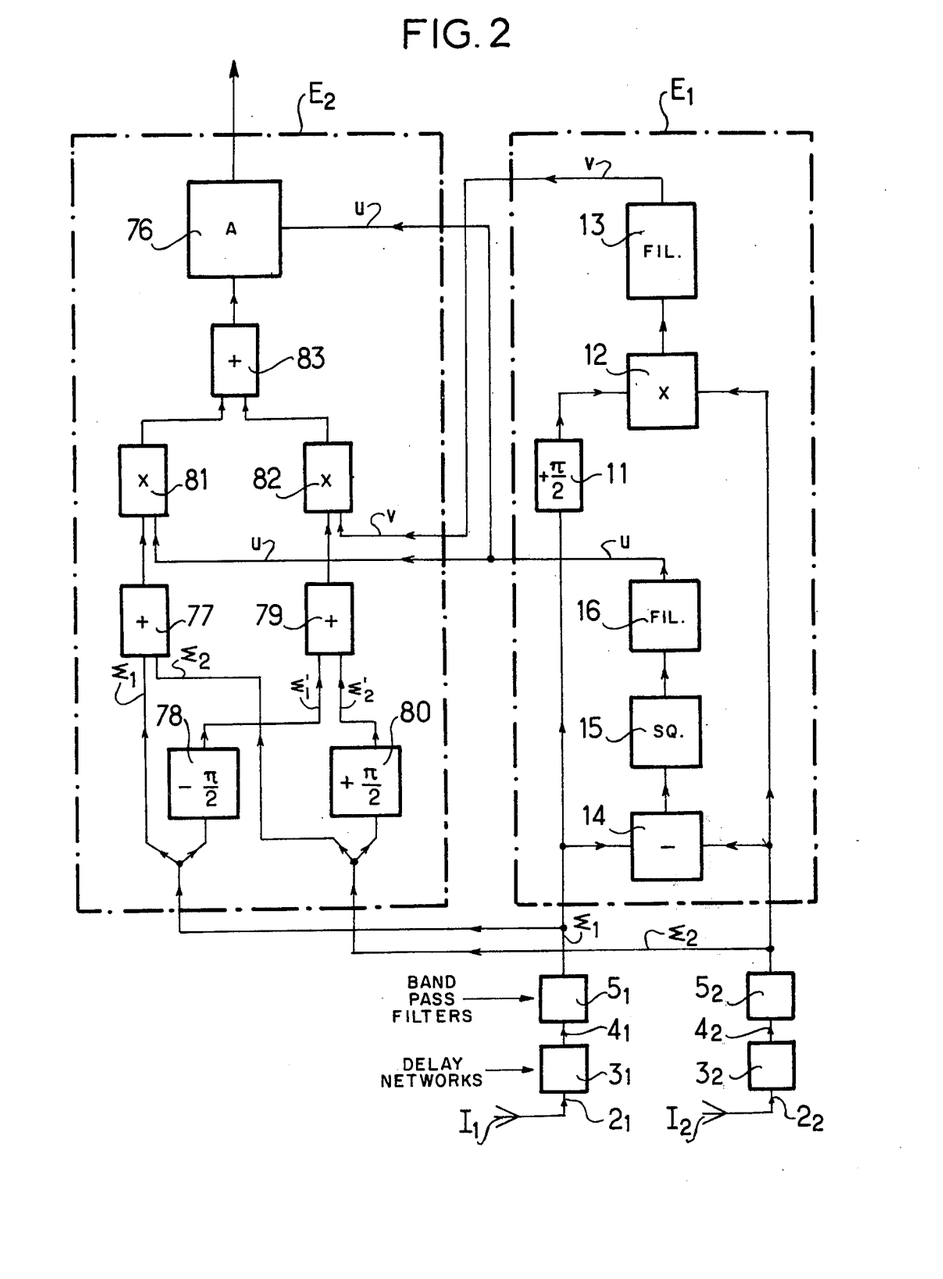
FIG. 2 shows a variant of the arrangement according to FIG. 1, which does not comprise a local frequency generator, and in which the multipliers form the product of an alternating voltage with a slowly variable voltage.
Figure 3:
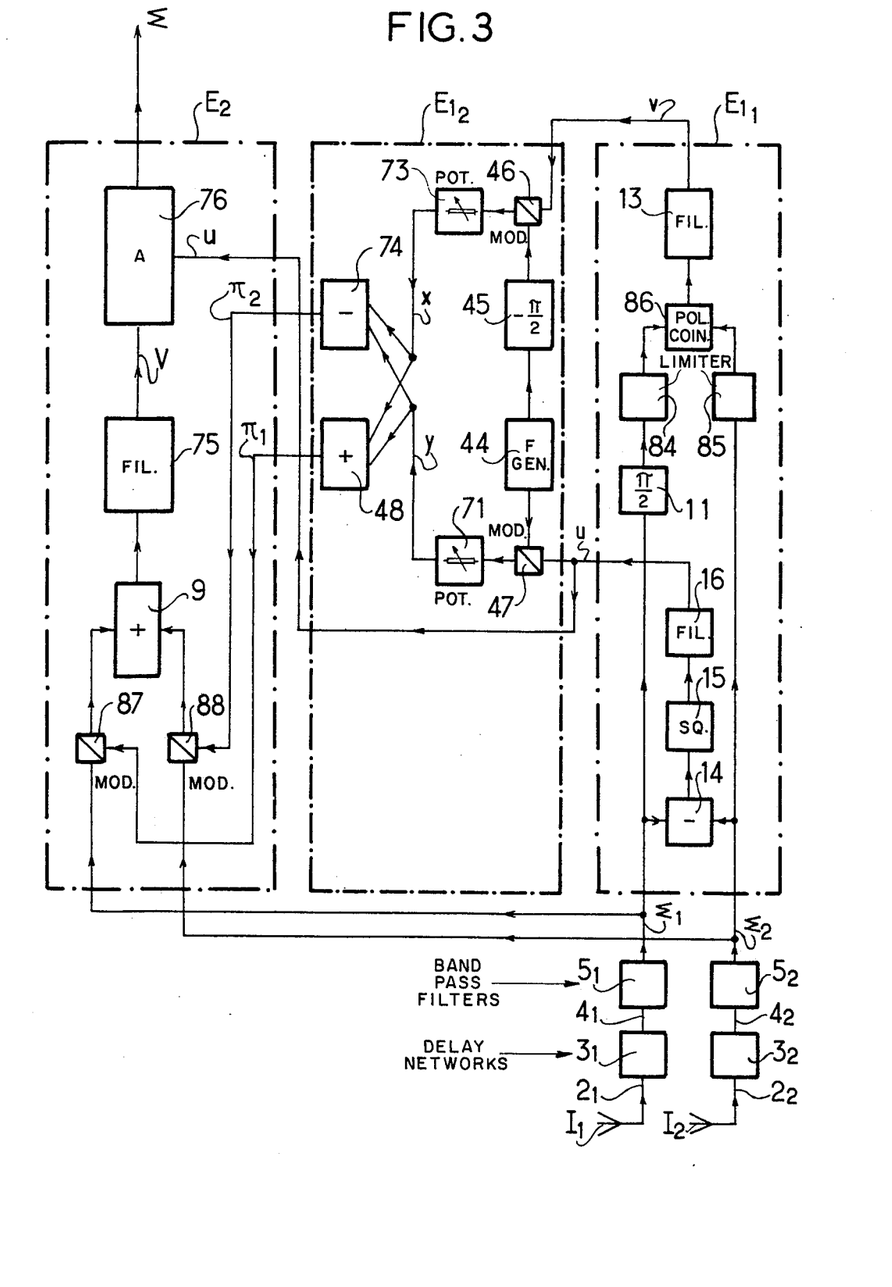
FIG. 3 shows another variant of the arrangement according to FIG. 1, which comprises a voltage squarer, but not multipliers, and which is applicable in the case where the strengths of the noises of two channels are equal to one another at each instant, as in the preceding case, and where in addition the slow variation of this common value of the power is compensated for on the two inputs of the arrangement by a system of automatic gain control.

The modified embodiment according to FIG. 3, which is also applicable to the case where the noise volumes on the inputs of the arrangement have the same value at any instant, does not comprise any voltage multiplier, contrary to the cases according to FIGS. 1 and 2.

It differs from the constructional form according to FIG. 1 in the following points:

In the sub-assembly $E_{1,1}$, the multiplier 12 is replaced by two peak limiters 84 and 85, of which the outputs are connected to the two inputs of a coincidence correlator 86, the output of the latter being connected to the input of the low-pass filter 13.

The peak limiters 84 and 85 receive alternating voltages at their input and supply at their output a square-wave voltage of amplitude $+a$ or $-a$, depending on the polarity of the said input voltages.

The coincidence correlator 86 is a logic network of known type, which supplies at its output a positive voltage when its two input voltages have the same sign, and a negative voltage of like absolute value when the said input voltages are of opposite signs.

However, in this case, an amplitude adjustment must be effected in $E_{1,2}$ on the voltages x and y by means of potentiometers 71 and 73, as a function of the common value P of the noise volumes $B_1$ and $B_2$. This adjustment will be made once for all, if this common value is regulated, at the inputs of the arrangement, by a gain control system as in FIG. 9.

Furthermore, in the assembly $E_2$, the two multipliers 70 and 72 are respectively replaced by modulators 87 and 88 of conventional type, for which the voltages $x + y$ and $x - y$ play the part of local frequencies.

Figure 4:
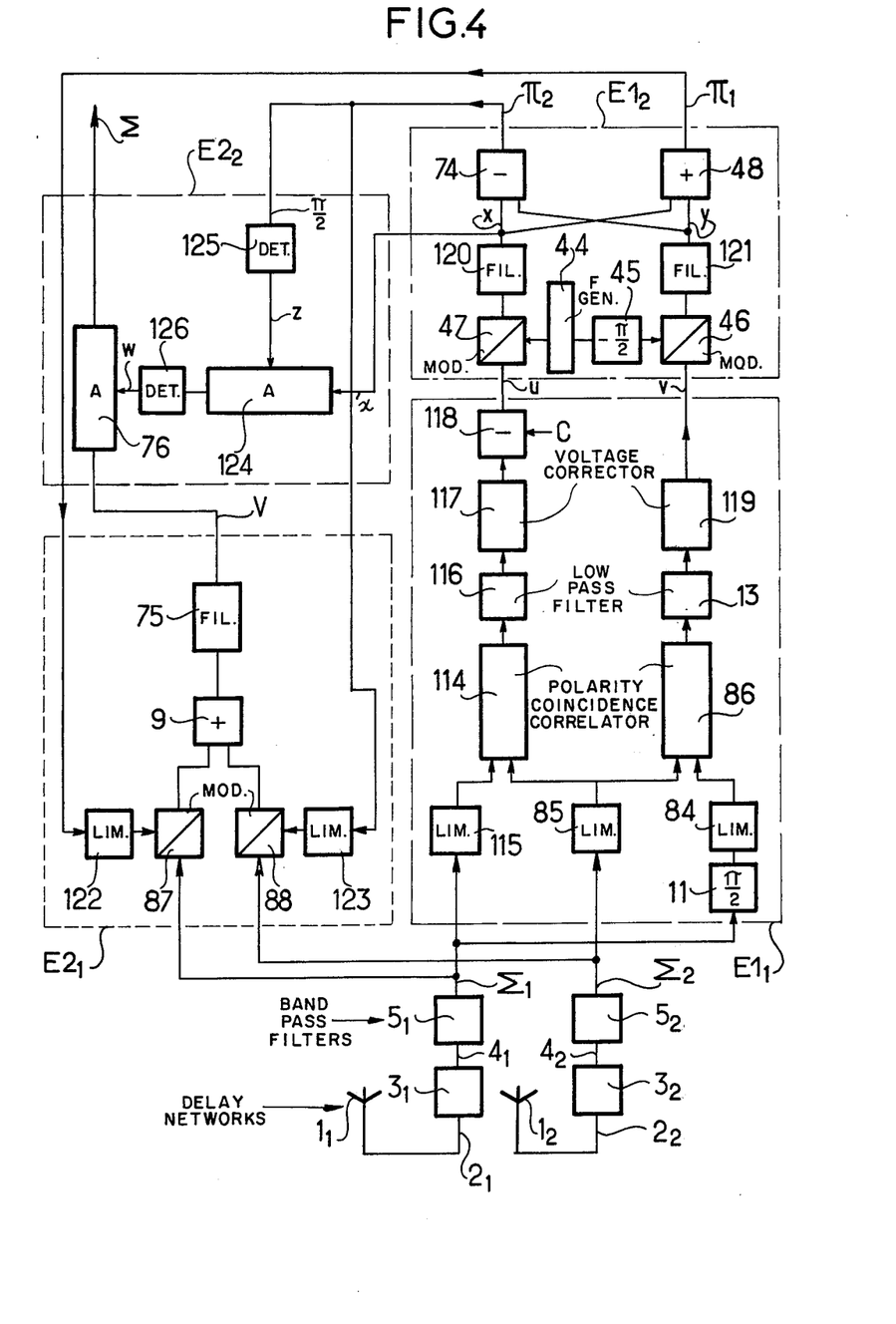
FIG. 4 represents an arrangement similar to that of FIG. 1, in which the measuring of the intercorrelation strengths of the noises is effected by means of correlators with polarity coincidence.

The arrangement according to FIG. 4 is a modification of the arrangement according to FIG. 3, and is characterised in that a polarity coincidence correlator, followed by a low-pass filter and its amplitude corrector, participates in the formation of each intermediate voltage $u$ and $v$.

The two aerial elements $1_1$ and $1_2$ are respectively associated with the two electric channels $2_1$ and $2_2$, in which are included the respective delay networks $3_1$ and $3_2$ serving to compensate for the difference between the useful signals obtained on the two channels so as to collect, at their respective outputs $4_1$ and $4_2$, two absolutely identical useful signals $S(t)$.

It is accepted that the spectrum of the signal $S(t)$ is entirely contained in a band of narrow frequency $f_o \pm \Delta f$.

Respectively connected to the outputs $4_1$ and $4_2$ are two identical band pass filters $5_1$ and $5_2$, of which the narrow band $2\Delta f$ is centered on the frequency $f_o$ and completely contains the useful signal $S(t)$ which is to be detected. On each channel the gain of these filters is identical, constant and advantageously equal to 1 in the band in question and zero or practically negligible outside the said band.

At the output of the filters $5_1$ and $5_2$, the useful signal is always $S(t)$ and the two interference noises are respectively $B_1(t)$ and $B_2(t)$, and into each channel, at the input of the assembly $E_1$ for determining the correction to be made, their arrives an aggregate signal $\Sigma_i$, composed of a useful signal S and a noise $B_i$, the index $i$ designating the order of the channel.

The two signals $\Sigma_1 = S + B$ and $\Sigma_2 = S + B_2$ are thus obtained at the input of the assembly $E_1$.

Two voltages $\pi_1$ and $\pi_2$ are then established in the assembly $E_1$ from the intercorrelation properties of the noises $B_1$ and $B_2$, and these voltages are then diverted towards the assembly $E_2$ to participate in the modification of the signal/noise ratio.

The assembly $E_1$ comprises two sub-assemblies, in one of which ($E_{1,1}$) are effected the measurements relating to the intercorrelation of the noises $B_1$ and $B_2$, while the other sub-assembly $E_{12}$ forms the said voltages $\pi_1$ and $\pi_2$ from the voltages $u$ and $v$ leaving the preceding sub-assembly.

In the sub-assembly $E_{11}$, the product of the two voltages leaving the filters $5_1$ and $5_2$ is obtained by means of a polarity coincidence correlator 114, which is preceded by the two respective limiters 115 and 85, providing at their output square-wave voltages of positive or negative amplitude, depending on the polarity of the input voltages.

The coincidence correlator 114 supplies at its output a standardised voltage equal to 1, which is either positive, when the input voltages have the same sign, or negative, in the opposite case.

The output of the correlator 114 is connected to a low-pass filter 116 of time constant T, of the same order of magnitude as the slow variations of the noises under consideration.

If the standard intercorrelation coefficient of the noises $B_1$ and $B_2$ is designated as R $(\theta)$, the output voltage of the filter 116 does not exactly have the said value R $(\theta)$, because of the limiting; there is in fact obtained at the output of the filter 116 a voltage $e = 2/\pi \sin^{-1} [R(\theta)]$. A correcting member 117 is then connected to the output of the filter 116, said member delivering at its output a voltage equal to sin $[\pi/2 \ e]$, when it is fed with an input voltage $e$; there is thus obtained at the output of the corrector 117 the slowly variable voltage of value R $(\theta)$, representing in adaptable manner the standard intercorrelation coefficient of the two noises $B_1$ and $B_2$, of a value smaller than 1.

The member 118 produces the difference between a continuous voltage C which is equal to 1 and the standard intercorrelation coefficient of the noises $B_1$ and $B_2$, represented by a voltage equal to R $(\theta)$. The voltage obtained at the output of the member 118 is:

$$u = 1 - R(\theta)$$

It is slowly variable and of constant sign.

The measurement of the standard intercorrelation coefficient J $(\theta)$ of the two noises $B_1$ and $B_2$, brought into phase quadrature is effected in a similar manner to that indicated above; however, the analogue multiplier (12 of FIG. 1) has been replaced by a polarity coincidence correlator 86 as in FIG. 3: this correlator produces the product of the voltages obtained at the outputs of the limiters 85 and 84.

The limiter 84, identical with the limiters 115 and 85, is preceded by the member 11 ensuring the shift in phase of $\pi/2$ of the voltage $\Sigma_1$ with respect to the voltage $\Sigma_2$.

The correlator 86, identical with the correlator 114, is connected to a low-pass filter 13 having the same time constant T as the low-pass filter 116 of the formation chain for the voltage $u$. The voltage obtained at the output of the filter 13 must likewise be corrected in a correcting member 119, identical with the member 117, so as to obtain at its output the voltage $v = J(\Theta)$, representing in adaptable manner the standard intercorrelation coefficient of the two noises $B_1$ and $B_2$, brought into phase quadrature relatively to one another.

The voltages u and v leaving the sub-assembly $E_{11}$ are then applied to the input of the sub-assembly $E_{12}$, is almost identical with that shown in FIG. 1: it comprises an auxiliary generator 44 supplying an auxiliary voltage of frequency F which is different from the mean frequency of the useful signal. The generator 44 supplies the local frequency F, on the one hand to a modulator 47 which is in addition fed by the voltage $u$ of very low frequency and, on the other hand, by means of the phase modulator 45 producing the shift in phase of $-(\pi/2)$, or advance of phase, at the frequency F, to a modulator 46 which is moreover fed with the voltage $v$ of likewise very low frequency.

The outputs of the two modulators 47 and 46 are respectively connected to the band-pass filters 120 and 121, both being centered on the frequency F and supplying at their outputs the voltages $x$ and $y$, respectively of frequency F, with slowly variable amplitudes which are respectively proportional to the voltages $u$ and $v$.

The voltage $x$ is applied simultaneously to one of the inputs of the summation or adding member 48 and to one of the inputs of the member 74 producing a difference, while the voltage $y$ is applied to each of the other inputs of the said members 74 and 48, and a voltage $\pi_1 = x + y$ is then obtained at the output of the member 48 and a voltage $\pi_2 = x - y$ is obtained at the output of the member 74, both being alternating voltages of frequency F.

The final voltages $\pi_1$ and $\pi_2$ are then directed to the assembly $E_2$. This latter comprises two subassemblies, one of which, $E_{21}$, serves for the correction of the aggregate signals $\Sigma_1$ and $\Sigma_2$ and then for the formation of the signal sum V, while the other $E_{22}$ effects the standardisation of the said signal V, that is to say, restores the amplitude of the useful signal S which it contains to its input value.

In the sub-assembly $E_{21}$, there is first of all effected the respective multiplications $\Sigma_1 \cdot \pi_1$ and $\Sigma_2 \cdot \pi_2$, by means of two limiters and two modulators.

For this purpose, the voltages $\pi_1$ and $\pi_2$ are brought to the respective limiters 122 and 123. The modulator 87 is fed on the one hand by the voltage $\Sigma_1$ of frequency fo and on the other hand by the output voltage of the limiter 122 and of frequency F.

Similarly, the modulator 88 is fed on the one hand with the voltage $\Sigma_2$ and on the other hand by the output voltage of the limiter 123.

The outputs of the modulators 87 and 88 are connected to the inputs of the summation member 9, to the output of which is connected a band-pass filter 75, designed to separate the upper lateral modulation band of frequency $fo + F$ and of voltage V, forming the sum signal.

This signal V is directed to the standardisation subassembly $E_{22}$ and applied to the input of an amplifier 76 of which the gain is controlled so as to compensate for the modification undergone by the amplitude of the useful signal S in the preceding members.

The gain of the amplifier 76 is inversely proportional to a control voltage $w$.

This latter is obtained from a controlled auxiliary amplifier 124 fed with the voltage obtained at the output of the filter 120. The gain of this amplifier is inversely proportional to a voltage $z$, which is slowly variable and of constant sign, obtained at the output of a linear envelope detector 125, to the input of which is brought the final voltage $\pi_2$ coming from the member 74.

A linear envelope detector 126, connected to the output of the auxiliary amplifier, then delivers at its output the said slowly variable voltage $w$ of constant sign and equal to the gain of the assembly of the arrangement.

There is then obtained, at the output of the amplifier 76, a signal $\Sigma$ comprising the useful signal S' of amplitude and phase equal to those of the signal S applied to the input of the arrangement, but accompanied by a reduced interference noise.

Figure 5:
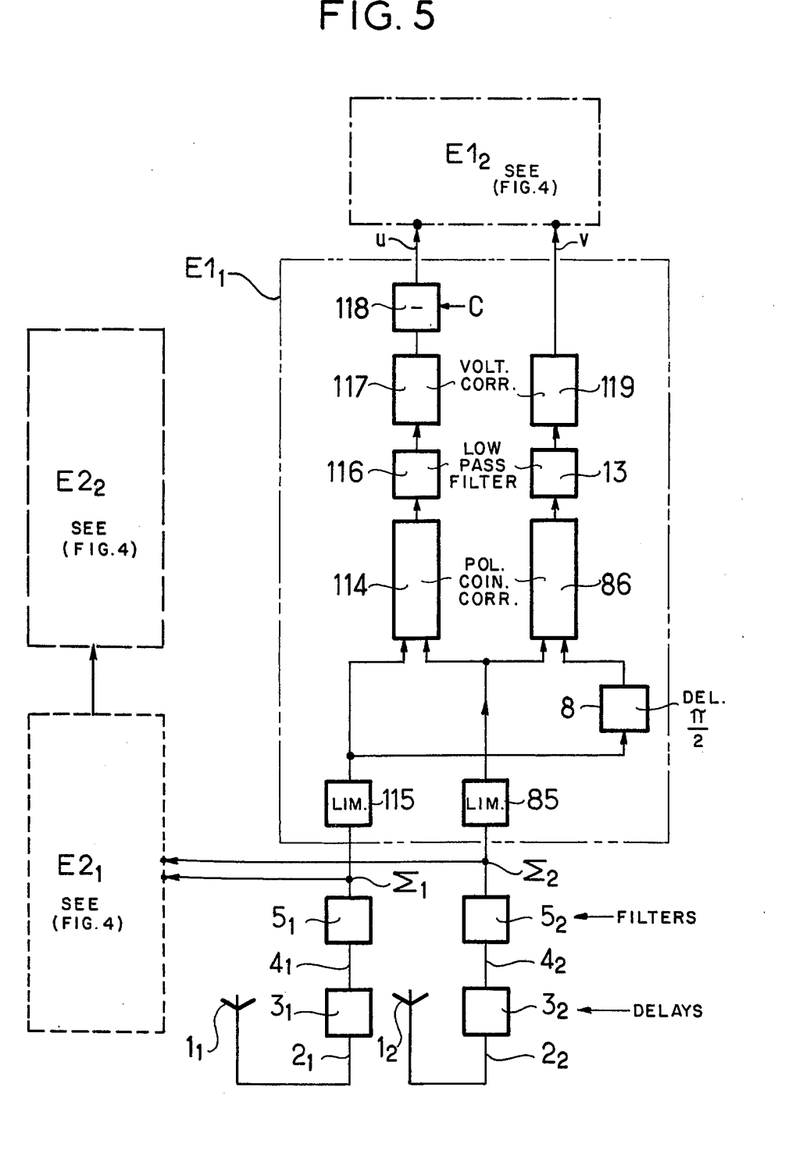
FIG. 5 shows a variant of the sub-assembly for measuring intercorrelation coefficients according to FIG. 3, in which the phase displacement of one of the noise signals received is effected by a delay line.

The modified arrangement according to FIG. 5 corresponds to FIG. 4 except for a modification of the sub-assembly $E_{11}$.

A delay line 8, connected to the output of the limiter 115, produces the shift in phase of $(\pi/2,)$ which is assured in FIG. 4 by the phase converter 11, to which was applied the signal $\Sigma_1$ before being limited by the limiter 84.

This delay line 8 shifts the square-waves leaving the limiter 115 in the time having the value $\zeta = (1/4f°)$, that is to say, a quarter period.

The coincidence correlator 86 is supplied, as in the diagram of FIG. 4, by the voltages leaving the limiter 85 and the delay line 8.

Under the conditions in which this arrangement is used, functioning with signals having a narrow frequency band, the delay line does not modify the performances of the system, of which moreover all the other members remain unchanged.

Figure 6:
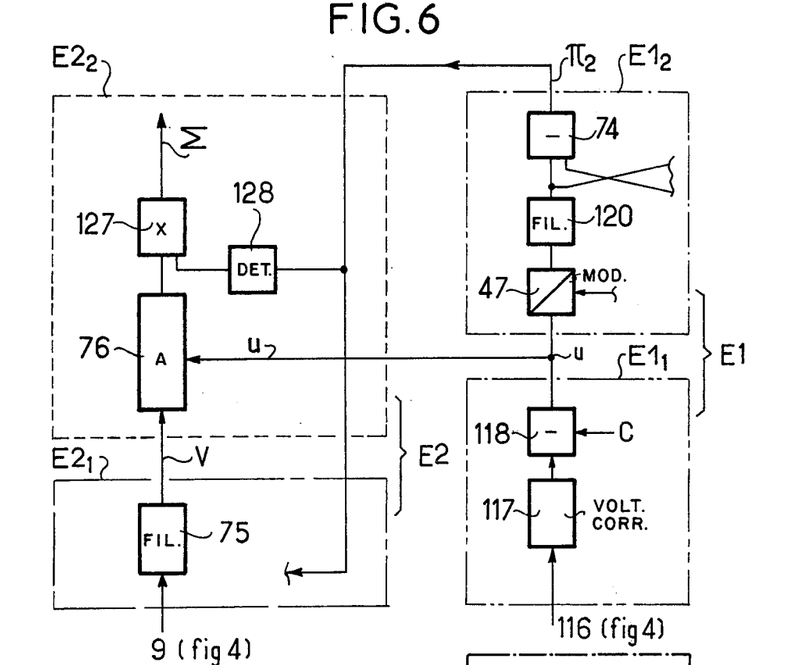
FIG. 6 shows a variant of the sub-assembly for standardising the sum signal.

FIG. 6 represents another variant of the FIG. 4 arrangement, in which it is only the sub-assembly $E_{22}$ for the standardisation of the signal V which is modified. This signal is applied to the input of the amplifier 76, of which the gain is inversely proportional to the voltage $u$ obtained at the output of the member 118.

The output of the amplifier 76 is connected to the multiplier 127, of which the other input, collecting the other term of the multiplication, is connected to the output of the linear envelope detector 128, which is itself fed with the voltage $\pi_2$ leaving the member 74 and supplying a slowly variable voltage of constant sign.

There is thus obtained at the output of the multiplier 127, a signal $\pi$ comprising a useful signal S' of amplitude and phase equal to those of the signal applied to the input of the arrangement, but associated with a reduced interference noise.

Figure 7:
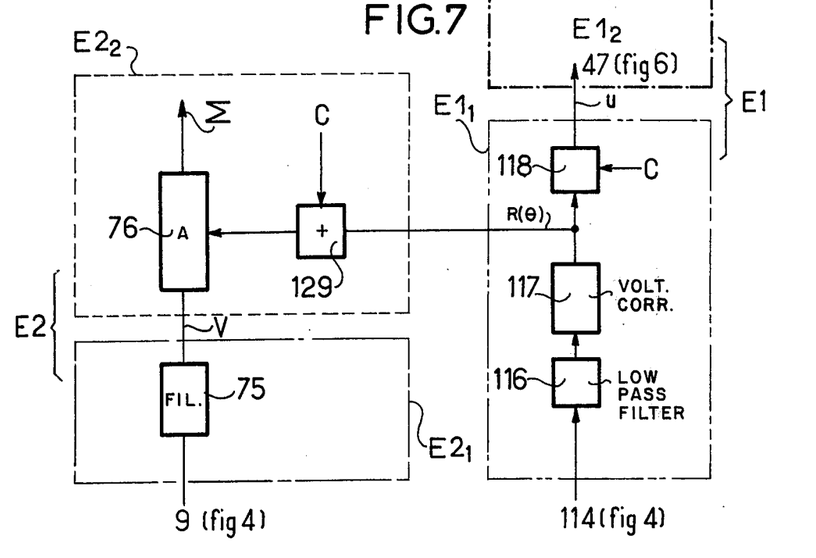
FIG. 7 shows a simplified variant of the standardisation sub-assembly, applicable only to the case of weakly correlated noises.

FIG. 7 shows an arrangement similar to that of FIG. 4, with respect to which only the sub-assembly $E_{22}$ has been modified and simplified, since it does not comprise either a multiplier or a linear envelope detector, but is only applicable when the noises $B_1$ and $B_2$ are weakly intercorrelated.

The voltage V of the signal sum is applied to the input of the amplifier 76, of which the gain is inversely proportional to the control voltage. This latter, received at the output of the adder 129, is equal to $1 + R(\theta)$, these two inputs being respectively fed with a unitary continuous voltage C and by the slowly variable voltage $R(\theta)$, present at the output of the corrector 117.

In the preceding modifications, the signal $\Sigma$ with an improved signal/noise ratio is obtained at the output of this arrangement.

Figure 8:
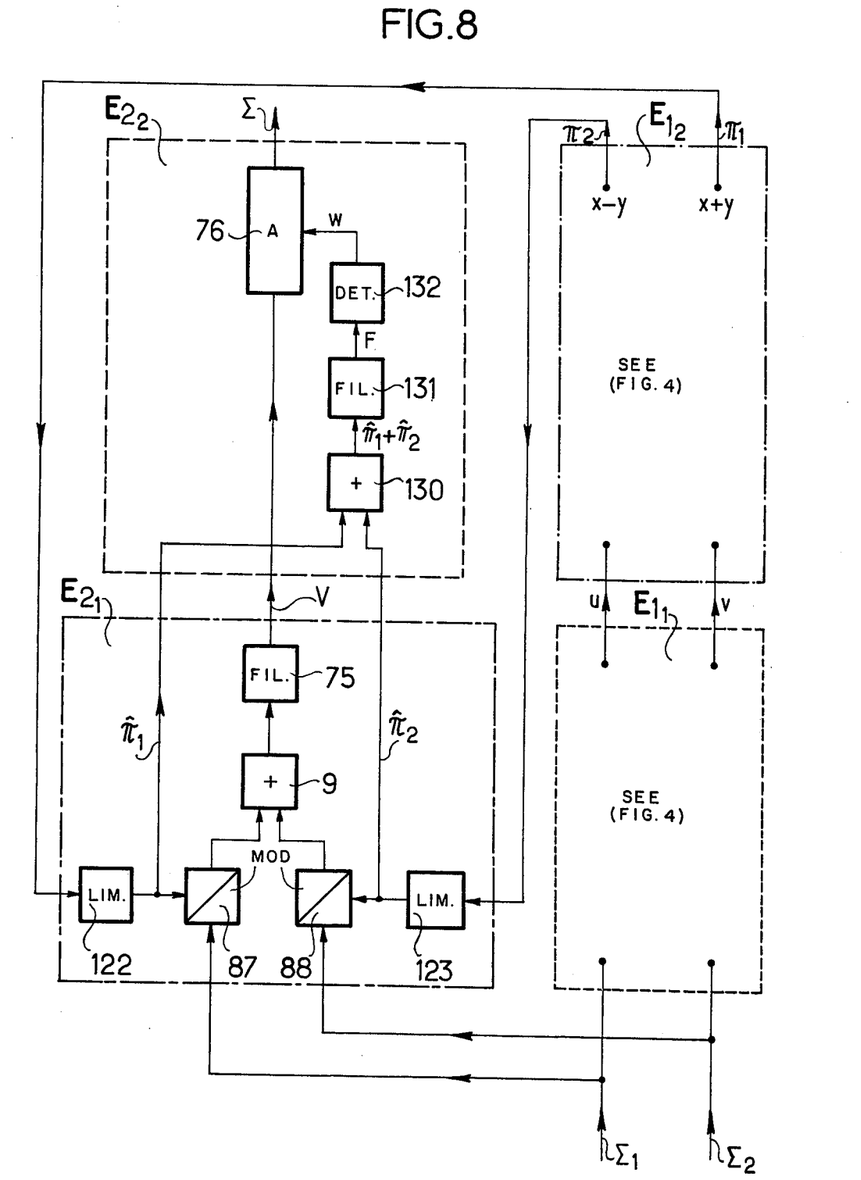
FIG. 8 shows a variant of the arrangement according to FIG. 5.

FIG. 8 shows another modification of the FIG. 4 means for supplying the control voltage $w$ to the main amplifier 76 of the sub-assembly $E_{22}$.

These means comprise a summation member, to the two inputs of which are applied, after limitation, the signals originating from the second determination subassembly, the output signal of the said summation or adding member feeding the control circuit of the amplifier by way of a band-pass filter and an envelope detector.

The said means are more simple than those previously mentioned, because they do not comprise a controlled gain auxiliary amplifier (such as 124 in FIG. 4).

These means can be used, regardless of the intercorrelation of the noises associated with the signals received.

Finally, because the said control voltage is built up from square-wave voltages at the output of the limiters of the first sub-assembly by a chain which does not comprise either a multiplier, or squarer or divider, the dynamics of the voltages at the various points of this chain are greatly reduced.

In FIG. 8, which partially reproduces FIG. 4, the modification is applicable only to the formation in the sub-assembly $E_{22}$ of the feeding circuit of the controlled gain amplifier 76. This circuit comprises an adding member 130, of which the inputs are respectively connected to the outputs of the limiters 123 and 122 of the sub-assembly $E_{21}$, and which supplies the control voltage w of the amplifier 76 by means of the band-pass filter 131 and the envelope detector 132.

Figure 9:
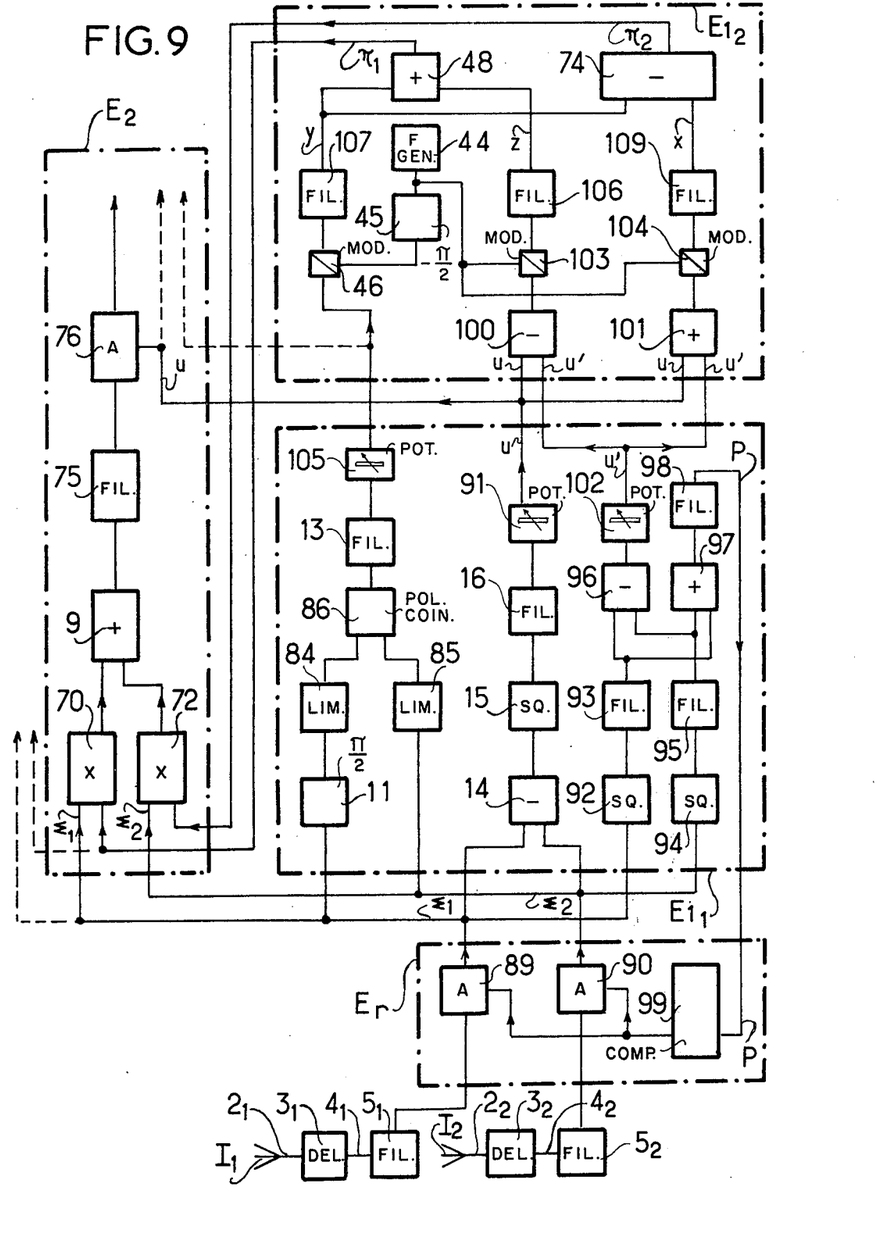
FIG. 9 shows an embodiment which comprises voltage squarers and an auxiliary generator, but no multiplier in the first assembly, and which is applicable, whatever may be the strengths of the noises on the two channels, the desired optimum condition being nevertheless only obtained when the ratio between these strengths remains substantially between 1 and 2.

The modified embodiment according to FIG. 9 is applicable to the general case where the noises on the two channels have any strength, provided however that the ratio of the said strengths remain substantially contained between 1 and 2.

In principle, this greater generalisation would necessitate the use of several multipliers in the assembly $E_1$. The actual fact, the solution proposed has the advantage of only comprising voltage squarers in the said assembly.

The assembly $E_{1,2}$ is of the "auxiliary frequency generator" type.

In addition, this solution comprises a supplementary arrangement known as the "regulation sub-assembly", upstream of the sub-assembly $E_{1,1}$, and adapted to keep constant the value of the mean of the strengths of the two interference noises. This regulation sub-assembly comprises two identical amplifiers 89 and 90 at the outputs of the filters $5_1$ and $5_2$, such amplifiers each comprising a gain control circuit fed with an error voltage expressing the variations of the said mean of the strengths, which is developed in $E_{1,1}$ in the form of a voltage P, as will hereinafter be more fully explained.

The output voltages of 89 and 90 enter the subassembly $E_{1,1}$, where they supply, as in the embodiment according to FIG. 1, a chain composed of a difference member 14, a squaring device 15 and a low-pass filter 16, followed by a potentiometer 91, at the output of which is obtained a slowly variable voltage u.

The output of the amplifier 89 is connected to the input of a squaring device 92, of which the output is connected to a low-pass filter 93 of time constant T, at the output of which is obtained a slowly variable voltage $p_1$, which represents the strength of the noise $B_1$ on the input $5_1$ of the arrangement.

Similarly, the output of the amplifier 90 is connected to the input of a squaring device 94, of which the output is connected to a low-pass filter 95 having the same time constant T, which produces a slowly variable voltage $p_2$, which represents the strength of the noise $B_2$ on the input $5_2$.

The output of the filter 93 is connected in parallel to the first inputs of a difference member 96 and an adder 97, while the output of the filter 95 is connected to the second inputs of the said members 96 and 97. The output of the difference member 96 is followed by a potentiometer 102, which supplies a slowly variable voltage u'.

The output of the adder 97 feeds a low-pass filter 98 having a time constant much higher than T, and which supplies a voltage P equal to the mean of $p_1$ and $p_2$ over a long time with respect to T. This voltage is sent to the input of the comparator member 99 of the regulation sub-assembly previously referred to.

On the other hand, the outputs of the ampliers 89 and 90 are connected to the chain of members 11, 84, 85, 86 and 13, identical with that according to FIG. 3. The output voltage of 13 can be adjusted by means of a potentiometer 105, which supplies a slowly variable voltage v.

The voltages u, u' and v are delivered to the subassembly $E_{1,2}$. In the latter, the voltage u obtained at the output of the potentiometer 91 is applied to the first inputs of a difference member 100 and an adder 101, while the voltage u' obtained at the output of the potentiometer 102 is applied to the second inputs of the said members 100 and 101.

The outputs of 100 and 101 are respectively connected to the first inputs of modulators 103 and 104, of which the second inputs are fed with local frequency by the auxiliary generator 44, which has previously been referred to. The outputs of the modulators 103 and 104 are respectively connected to the band-pass filters 106 and 109 centred on the frequency F: the output voltages of the filters are thus voltages at the frequency F, of slowly variable amplitude, which will be indicated by z and x respectively.

The voltage v feeds the first input of the modulator 46, of which the second input is fed at local frequency by the generator 44 by means of the phase converter 45 producing a phase shift of $-(\pi/2)$ at the frequency F.

The output of the modulator 46 is connected to a low-pass filter 107 centered on the frequency F, and at the output of which there is obtained a voltage at the frequency F and of slowly variable amplitude, indicated by y.

The outputs of 106 and 107 are connected to the inputs of an adder member 48 and the outputs of 107 and 109 are connected to the inputs of a difference member 74.

The output voltages of the adder 48 and of the difference member 74 are applied to a chain of modifying members (assembly $E_2$) identical with that according to FIG. 1.

In the case of this FIG. 9, the ratio of the strengths of the two noises $B_1$ and $B_2$ is limited in practice to values which are substantially between 1 and 2, because within these limits, the regulation of the arithmetic mean of the two noises gives a result which differs little from that which would be obtained by the regulation, necessitating a much more complicated installation, of their geometric mean.

Figure 10:
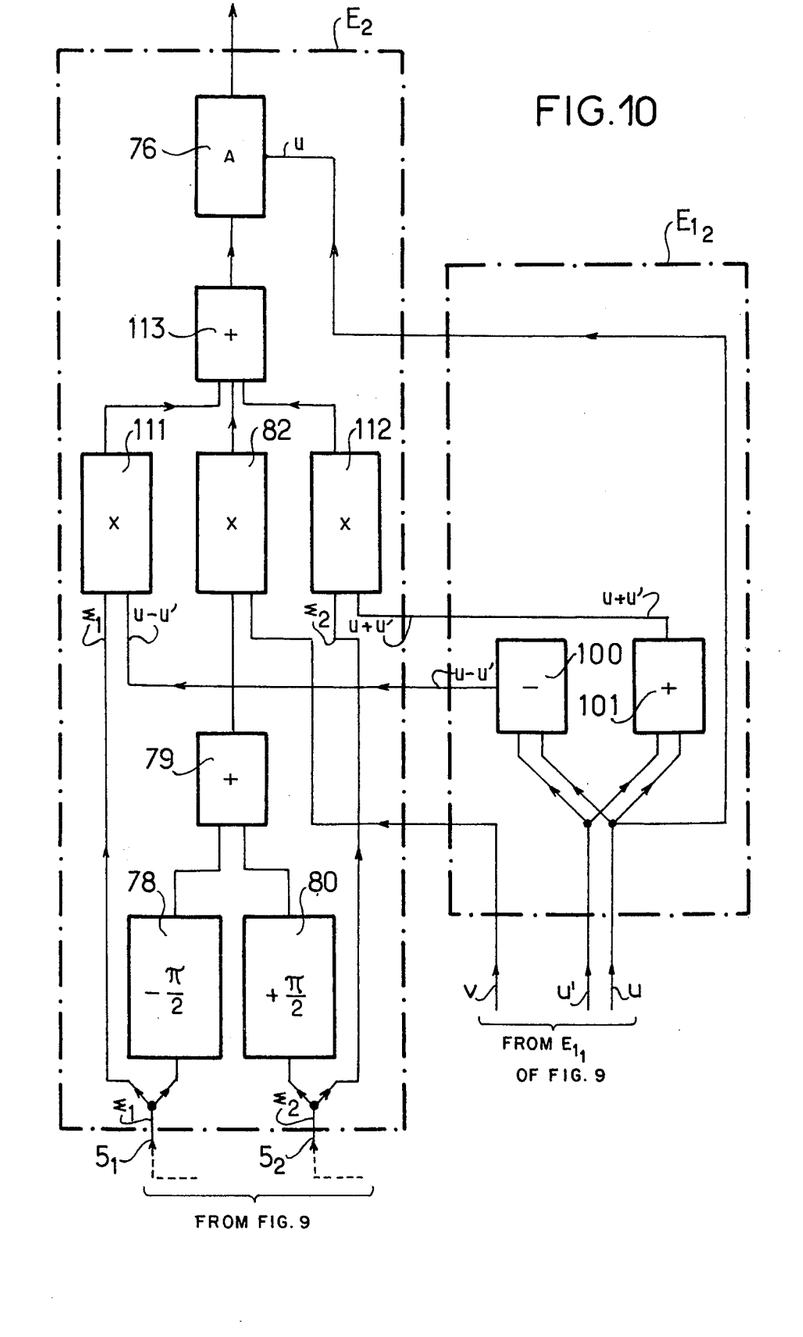
FIG. 10 shows a variant of a part of FIG. 9, comprising multipliers of alternating voltages by slowly variable voltages, but not an auxiliary generator.

FIG. 10 shows a modification of the arrangement according to FIG. 9, differing from this latter arrangement substantially in the same manner as the arrangement according to FIG. 2 differs from the arrangement according to FIG. 1.

The sub-assembly $E_{1,2}$ is reduced to the difference member 100 and adding member 101. The output voltages $u - u'$ and $u + u'$ of these two members are delivered to the assembly $E_2$, wherein addition, the voltages u and v are directly received.

In FIG. 10, the sub-assembly $E_{1,1}$ is not shown, nor are the members which are upstream of this latter, because they are identical with those according to FIG. 9.

On the other hand, the assembly $E_2$ is modified as follows:

The inputs $5_1$ and $5_2$ (FIG. 9) are respectively connected, on the one hand, directly to the first inputs of the multipliers 111 and 112, of which the second inputs are connected to the outputs of 100 and 101 (subassembly $E_{1,2}$) and, on the other hand, by means of phase converters 78 and 80 respectively producing phase shifts of $-\pi/2$ and $+\pi/2$, to the inputs of the adder 79, the output of which feeds an input of a voltage multiplier 82, of which the other input is directly fed by the voltage $v$ delivered from the sub-assembly $E_{1,2}$ (FIG. 9). The outputs of these three multipliers are respectively connected to the inputs of an adder 113, of which the output is connected to the input of a controlled amplifier 76 identical with that of FIG. 1, and so arranged that its gain is inversely proportional to the voltage $u$.

The three multipliers of the assembly $E_2$ are thus multipliers of an alternating voltage by a slowly variable voltage.

The present invention is not limited to the application to the treatment of signals two by two or in pairs, but is applicable to all the other forms of treatment of signals received on any number of aerial elements, particularly N by N, by association or combination with the said treatment in pairs as described above. For this purpose, the third assembly of members transforms the signal V at its output into a final signal $\Sigma$, in which the useful signal S is substantially identical with that which it was at the input, only its frequency being modified ($f + F$ instead of $f$), so that it can be subjected to a new regrouping.

Figure 11:
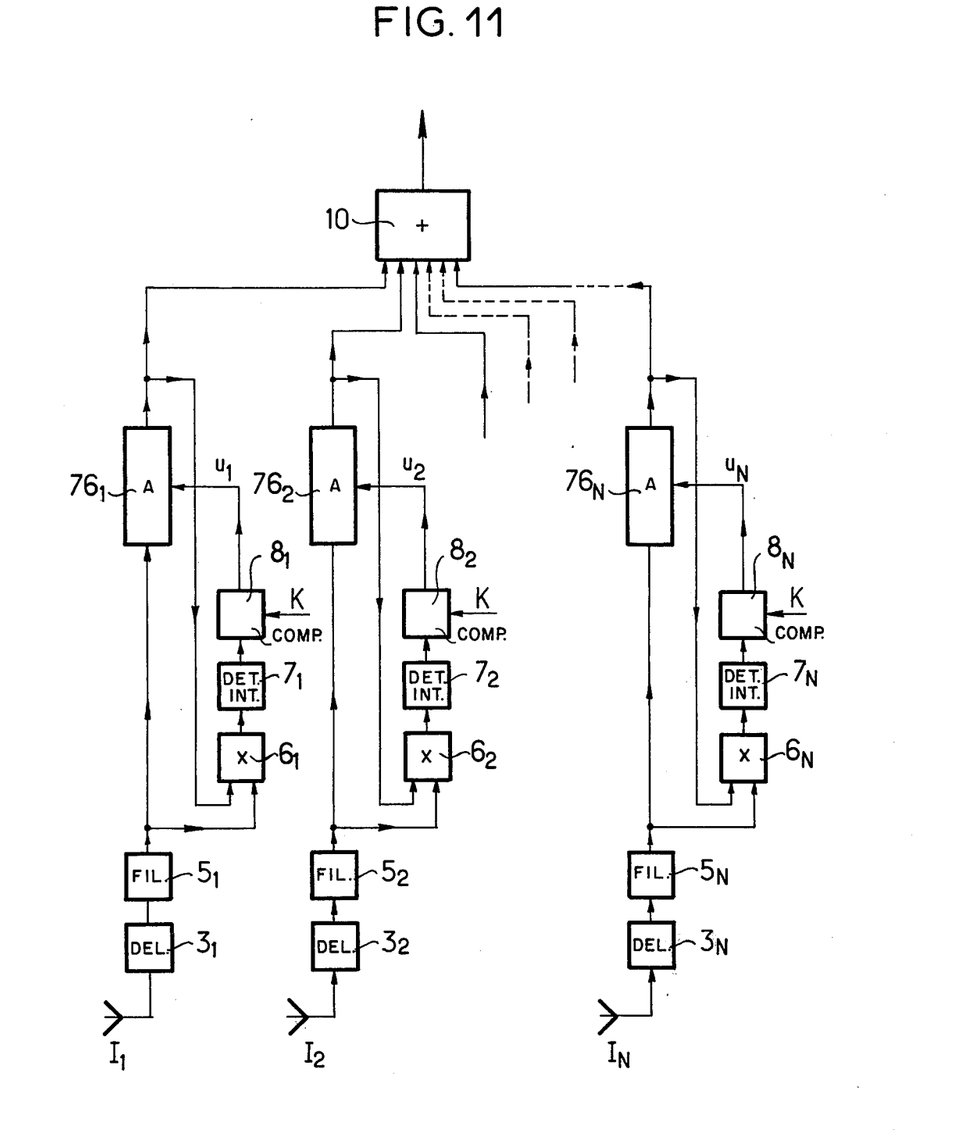
FIG. 11 shows a variant of the supply arrangement of the control circuit of the controlled gain amplifier included in the second assembly.

FIG. 11 has for its object an embodiment of the arrangement according to the invention which functions under good conditions even if the "useful signal/noise" ratio of the aggregate signals received is high.

This arrangement comprises in known manner as many identical "chains" as there are elements of the aerial, each chain comprising a compensating member downstream of the corresponding aerial element, in order to make equal the aggregate signals received on all the chains, and a band-pass filter centered on the frequency of the useful signals, while at their output, the different chains are connected to the inputs of an adder member, at the output of which is obtained an aggregate signal of which the "useful signal/noise" ratio is higher than the corresponding ratio of the aggregate signal at the input of a chain.

The arrangement according to this form of the invention is particularly characterised by each chain comprising, downstream of the aforesaid band-pass filter, an amplifier of which the gain is inversely proportional to a control voltage, the said control voltage being obtained as follows: the voltages at the input and at the output of the amplifier are respectively applied to the two inputs of a multiplier member, of which the output voltage feeds by way of a detector-integrator member an input of a comparator member which receives on its other input a continuous reference voltage which is identical for all the chains, the voltage at the output of the said comparator member constituting the control voltage of the amplifier, which voltage exactly represents the sound energy received on the corresponding chain.

The arrangement illustrated comprises N chains, each connected to an aerial such as $I_1$, and comprising in series a compensator member such as $3_1$, a band-pass filter such as $5_1$, and a controlled gain amplifier such as $76_1$, the outputs of all these amplifiers being connected to the inputs of an adding member 10, at the output of which is obtained a useful signal of the same amplitude as that applied to the input of the arrangement, but accompanied by a noise of lower strength.

The control voltage $U_1$ of the amplifier, such as $76_1$, is obtained as follows: the voltages at the input and output of the said amplifier are applied to the two inputs of a multiplier member $6_1$, of which the output voltage supplies, by means of a detector and integrator device $7_1$, one input of a comparator member $8_1$. The other input of this member $8_1$ is fed with a continuous reference voltage K, identical for all the chains, and it is the output voltage of the said member which forms the control voltage $U_1$ of the amplifier $76_1$.

The other chains are identical.

The continuous reference voltage K can be made dependent by any known means on the sum of the energies of the noises on the different chains.

I claim:

1. Arrangement for improving the "useful signal/noise" ratio of electric signals received on at least two aerials, applicable in the case where the useful signals occupy a band of narrow frequencies around a mean value $f_o$, and in which the noises $B_1$ and $B_2$ received on the two aerials are at least partially intercorrelated, said arrangement comprising:

first compensating means including delay means for making identical with a common value S the useful signals emanating from each aerial to develop first and second compensated aggregate signals $\Sigma_1 = S \neq B$ and $\Sigma_2 = S \neq B_2$, a first assembly including means for developing an electric control voltage $u$ which is a function of the intercorrelation coefficient of the noises $B_1$ and $B_2$, and means for developing an electric control voltage $v$ proportional to the intercorrelation coefficient of the noises $B_1$ and $B_2$ brought into phase quadrature with respect to one another, a second assembly comprising an auxiliary voltage generator of given frequency $F \neq f_o$, means for developing from said frequency F and said voltages $u$ and $v$ sinusoidal voltages $x$ and $y$ of frequency F and of amplitudes related to said control voltages $u$ and $v$, and summation and difference means, for developing voltages $\pi_1$ and $\pi_2$ based on said $x$ and $y$ voltages, and a third assembly comprising means for respectively multiplying with one another the voltages $\pi_1$ and $\Sigma_1$, on the one hand, and $\pi_2$ and $\Sigma_2$ on the other hand to develop two products, summing means for taking the sum of the said products, second compensating means coupled to said summing means and to at least one of said first and second assemblies for compensating said product sum for the compensation effected by said first compensating means to develop the desired useful signal with reduced noise.

said second compensating means including controlled gain amplifier means coupled to said summing means for receiving said product sum therefrom and having a gain inversely related to at least one of said $u$ and $v$ control voltages.

2. Arrangement according to claim 1, characterised in that the first assembly includes means for displacing the voltages $\Sigma_1$ and $\Sigma_2$ in phase by $\neq \pi/2$, and a coincidence correlator, at the output of which is obtained the voltage $v$ and to the inputs of which are applied said phase displaced voltages.

3. Arrangement according to claim 1, characterised in that the third assembly includes two modulators for receiving the voltages $\Sigma_1$ and $\Sigma_2$ and having control circuits which respectively receive the voltages $\pi_1$ and $\pi_2$.

4. Arrangement according to claim 2, characterised in that it comprises a second correlator in the first assembly to the inputs of which correlator are applied the voltages $\Sigma_1$ and $\Sigma_2$, the output voltage of this second correlator being applied, after filtering and correction, to an input of a difference circuit, of which the other input receives a fixed continuous voltage, the voltage $u$ being obtained at the output of this difference circuit.

5. Arrangement according to claim 3, characterised in that, in the third assembly, the voltages $\pi_1$ and $\pi_2$ issuing from the second assembly pass through peak limiters before being applied to the modulators, and that, in the third assembly, the amplifying means includes a control circuit fed by means of a first envelope detector which is fed by the output of an auxiliary controlled gain amplifier, of which the input receives the voltage $x$ and of which the control circuit thereof receives the voltage $\pi_2$ by means of a second envelope detector.

6. Arrangement according to claim 2, characterised in that the phase displacement by $\pi/2$ is of the voltage $\Sigma_1$ and is effected by a delay network.

7. Arrangement according to claim 1, characterised in that, in the third assembly, the controlled gain amplifier means is directly controlled by the voltage $u$ and its output is connected to an input of a multiplier, of which the other input receives, by means of a linear envelope detector, the voltage $\pi_2$ emitted by the second assembly of members, the desired signal being obtained at the output of the said multiplier.

8. Arrangement according to claim 4, characterised in that, if the noises $B_1$ and $B_2$ are weakly intercorrelated, the controlled gain amplifier means of the third assembly is controlled by the output voltage of an adder, of which the two inputs are respectively connected to the two inputs of difference circuit.

9. Arrangement according to claim 3, characterised in that the said modulator control circuits are respective peak limiters and control circuit of the controlled means is fed via an envelope detector by the sum of the voltages derived downstream of the two peak limiters.

10. Arrangement according to claim 1, applicable in the cases where the strengths of the sounds on the two channels are different, characterised in that it comprises two devices respectively supplying a voltage $u'$ proportional to the difference of the mean strengths of the two noises and a voltage P proportional to the sum of said mean strengths, means responsive to the voltage P to make constant the mean of the strength of the noises received by the said two devices, means for modulating the voltages $v$, $u - u'$, and $u + u'$ by the frequency of the auxiliary generator in order respectively to obtain voltages $y$, $z$ and $x$, and means for causing said voltages $\pi_1$ and $\pi_2$ to respectively $= y + z$ and $y - x$, for said multiplying means.

11. An arrangement for improving the signal to noise ratio of signals received on at least two aerials, applicable when the useful signals occupy the narrow band of frequencies around a mean frequency $f_o$, and in which the noises B1 and B2 received on the two aerials are at least partially intercorrelated said arrangement being of the type in which the received useful signals are made identical with each other to effect the first input signal E1 which includes B1 and a second input signal E2 which includes B2, the improvement comprising:

means for developing a control voltage $u$ which is a function of the intercorrelation coefficient of the noises B1 and B2, means for developing a control voltage $v$ proportional to the -intercorrelation coefficient of the noises B1 and B2 in phase quadrature, first summing means for adding said first and second input signals E1 and E2, means including second summing means for adding the first and second input signals E1 and E2 after respective phase shifts thereof in opposite directions by $\pi/2$, means for multiplying the sum from the first summing means by one of said control voltages to develop a first product voltage and the sum from the second summing means by the other of said control voltages to develop a second product, third summing means for taking the sum of said product voltages, and means including controlled gain amplifier means for receiving said product and controlling its gain in inverse relation to at least one of said control voltages to develop the desired useful signal with noise.

12. An arrangement for improving the signal to noise ratio of signals received on at least two aerials, applicable when the useful signals occupy the narrow band of frequencies around a mean frequency $f_o$, and in which the noises B1 and B2 receive on the two aerials are at least partially intercorrelated said arrangement being of the type in which the received useful signals are made identical with each other to effect the first input signal E1 which includes B1 and a second input signal E2 which includes B2, the improvement comprising:

means for developing a control voltage $u$ which is a function of the intercorrelation coefficient of the noises B1 and B2, means for developing a control voltage $v$ proportional to the intercorrelation coefficient of the noises B1 and B2 in phase quadrature, means for developing a voltage $u'$ proportional to the difference of the mean strengths of the two noises, means for making constant the said main strengths including means for developing a voltage P proportional to the sum of said main strengths, summing means for developing a sum signal representing $u \neq u'$, a subtracting circuit for effecting a difference signal $u - u'$, first multiplying means for effecting a first product signal representing the multiplication of the first input signal E1 and its constant mean strength noise by said difference signal, second multiplying means for effecting the second product signal representing the multiplication of the second input signal E2 and its constant mean strength noise by said sum signal, means including third multiplication means for effecting a third product signal representing the multiplication of control voltage $v$ by the sum of the said constant mean strength input signals E1 and E2 shifted in opposite directions by $\pi/2$, means for taking the sum of said product signals, and means including controlled gain amplifier means for receiving said product signal sum and controlling its gain in inverse relation to at least one of said control voltages to develop the desired useful signal with reduced noise.

13. In an arrangement for improving the useful signal to noise ratio of signals received on a plurality of aerials, applicable when the useful signals occupy a narrow band of frequencies around a mean frequency, and in which the noises received by the respective aerials are at least partially intercorrelated, said arrangement being of the type in which the received useful signals are made identical with each other to effect a respective input signal E, which includes the respective noise, the improvement comprising:

a plurality of controlled gain amplifiers having the first input for receiving the respective input signals E and a second input for receiving a respective gain control signal for developing a respective amplifier output signal, means for each amplifier for developing the respective gain control signals including a respective multiplier having two inputs for the respective input signal E and the respective amplifier output signal, a detector-integrator connected to the output of said multiplier, and a comparator for comparing the output of said detector-integrator with a continuous reference voltage, which is identical for each comparator, for developing the respective amplifier gain control signal, and summing means for adding the said output signals from each of said amplifier to develop the desired useful signal with reduced noises.

14. An arrangement as in claim 13 including means for causing the said continuous reference voltage for each comparator to be dependent on the sum of the energies of the noises received by the said plurality of aerials.

15. In an arrangement for improving the useful signal to noise ratio of signals received on at least two aerials, applicable when the useful signals occupy a narrow band of frequencies around a mean frequency $f_o$, and in which the noises $B_1$ and $B_2$ received on the two aerials are at least partially intercorrelated, said arrangement being of the type in which the received useful signals are made identical with each other to effect a first input signal $E_1$ which includes $B_1$ and a second input signal $E_2$ which includes $B_2$, the improvement comprising:

means for developing at least two control voltages which are functions of the intercorrelation coefficient of the noises $B_1$ and $B_2$ in phase and in phase quadrature, means for effectively multiplying said input signals by said control voltages to develop a plurality of products, summing means for taking the sum of the said product, and means including controlled gain amplifier means for receiving said product sum and controlling its gain in inverse relation to at least one of said control voltages to develop the desired useful signal with reduced noise.

* * * * *